United States Patent
Falter et al.

(10) Patent No.: US 7,496,624 B2
(45) Date of Patent: Feb. 24, 2009

(54) CLIENT REGISTRATION FOR PURPOSES OF MAINTAINING DETAILED CLIENT INFORMATION AT A WEB SERVICES REGISTRY

(75) Inventors: Timm Falter, Sinsheim (DE); Sindambiwe Eugene, Eppelheim (DE)

(73) Assignee: Sap AG, Walldorf (DE)

( * ) Notice: Subject to any disclaimer, the term of this patent is extended or adjusted under 35 U.S.C. 154(b) by 793 days.

(21) Appl. No.: 11/027,418

(22) Filed: Dec. 29, 2004

(65) Prior Publication Data
US 2006/0168175 A1  Jul. 27, 2006

(51) Int. Cl.
*G06F 15/16* (2006.01)

(52) U.S. Cl. ............... 709/203; 709/200; 709/217; 709/218; 709/219; 709/224; 707/1; 707/9; 707/10

(58) Field of Classification Search ........... 709/200, 709/203, 217, 218, 219, 224; 707/1, 9, 10
See application file for complete search history.

(56) References Cited

U.S. PATENT DOCUMENTS

| 7,003,546 | B1 * | 2/2006 | Cheah ............... 709/200 |
| 2002/0007285 | A1 * | 1/2002 | Rappaport ............ 705/2 |
| 2003/0028549 | A1 | 2/2003 | Hartel et al. |
| 2004/0049538 | A1 * | 3/2004 | Akamatsu et al. ...... 709/203 |
| 2004/0122853 | A1 | 6/2004 | Moore |
| 2004/0122939 | A1 * | 6/2004 | Perkins ............... 709/224 |
| 2004/0215655 | A1 | 10/2004 | Rangadass |
| 2004/0215662 | A1 | 10/2004 | Rangadass |

OTHER PUBLICATIONS

"FOA Mailed Sep. 27, 2007 for U.S. Appl. No. 11/027,810", (Sep. 27, 2007), Whole Document.
"OA Mailed Apr. 17, 2007 for U.S. Appl. No. 11/027,810", (Apr. 17, 2007), Whole Document.

* cited by examiner

*Primary Examiner*—Jinsong Hu
(74) *Attorney, Agent, or Firm*—Blakely Sokoloff Taylor & Zafman

(57) ABSTRACT

A method is described to implement a web services environment in which web based service providers can be discovered and accessed with a web based registry. The method includes forcing a client to undergo a registration process as a condition for the client's discovering and/or accessing a web based service provider through the registry. The registration process is to gather information describing the client.

15 Claims, 5 Drawing Sheets

CLIENT REGISTRATION FOR PURPOSES OF MAINTAINING DETAILED CLIENT INFORMATION AT A WEB SERVICES REGISTRY

FIELD OF INVENTION

The field of invention relates generally to web services; and, more specifically, to client registration for purposes of maintaining detailed client information at a web services registry.

BACKGROUND

Efforts are being made to more easily conduct business in a web based environment. "Web Services" is loosely understood to mean the ability to discover and conduct business in a web based environment. For example, a user (e.g., a web based application or person with a web browser) may: 1) search through an on line registry of businesses and/or services; 2) find a listing in the registry for web based access to a service that that the user desires to have performed; and then, 3) engage in a web based business relationship with the service application including the passing of relevant information (e.g., pricing, terms and conditions, etc.) over the network.

FIG. 1 shows a generic structure of the web services concept. At the core of a web service is a registry 101 that lists service providers $102_1$ through $102_N$ who offer their services through a web interface (e.g., businesses that provide specific services, government organizations that provide specific services, internal departments within a private web environment, etc.). Each separate service provider can also be referred to as a web service "publisher" because of its listing in the registry 101.

In practice, a potential user or customer 103 ("a client") that seeks a service invokes a search through the content of the registry 101. After a suitable service provider is found in the registry 101, the registry 101 forwards to the client 103 instructions on how to access and use the selected service provider's web interface.

Because successful implementation depends upon orchestrated communication and behavior amongst disparate members, a "standard" has evolved that attempts to specify these communications and behaviors. This standard, entitled Universal Discovery, Description and Integration (UDDI), defines provisions for a universal registry 101 containing white pages (contact information), yellow pages (industry classification) and green pages (description of services).

The registry 101 itself is implemented as a distributed network of servers that exchange updated registration information. The UDDI specification also defines a collection of XML based SOAP protocol messages that the different participants (service providers, the registry, clients. etc) exchange amongst each other as appropriate.

A problem, however, is that the UDDI model allows clients to behave largely as anonymous entities. That is, the registry 101 does not require a client 103 to identify himself/herself/itself in order to use the registry's resources. In some cases, the UDDI registry may ask a client if the client wishes to receive future notices and/or other information from a service provider (thereby requiring the client to provide self identifying information). But presently, clients are not required by the UDDI registry as a general rule to submit any self-identifying information as a condition for using the registry or the services of its published service providers.

As such, typically, little (if anything) is known about a client prior to that client's being provided with access and use information for a particular service by the registry. Because many business relationships require a need for knowing the customer/client in some detail, at a minimum, the current UDDI specification either cannot support certain business relationships; or, forces the service providers' themselves to design functional logic that requires a client to unveil himself/herself/itself before a business relationship is entertained.

SUMMARY

A method is described to implement a web services environment in which web based service providers can be discovered and accessed with a web based registry. The method includes forcing a client to undergo a registration process as a condition for the client's discovering and/or accessing a web based service provider through the registry. The registration process is to gather information describing the client.

FIGURES

The present invention is illustrated by way of example and not limitation in the figures of the accompanying drawings, in which like references indicate similar elements and in which.

DETAILED DESCRIPTION

Figure 1:
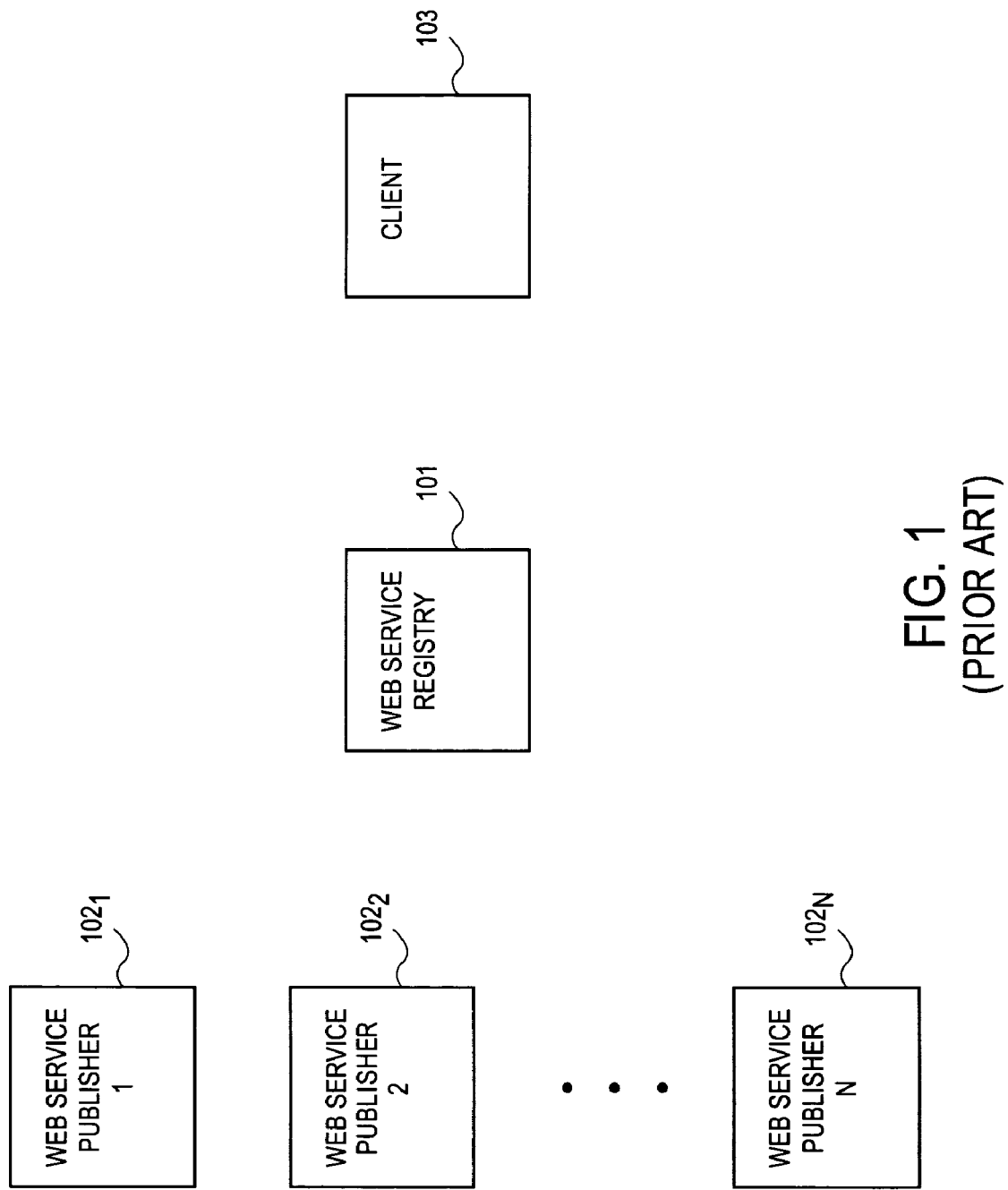
FIG. 1 (prior art) shows a prior art web services model.
Figure 2:
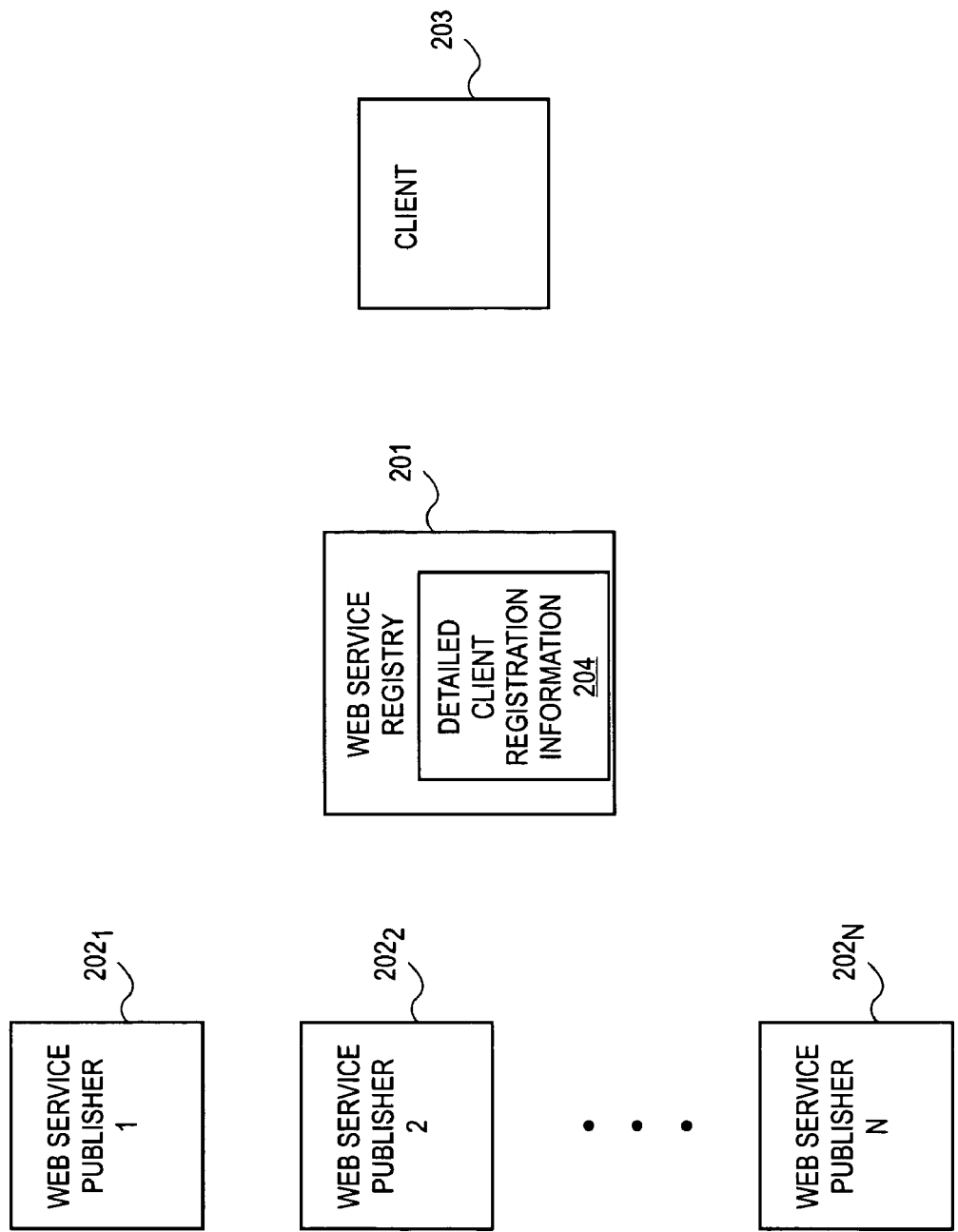
FIG. 2 shows an improved web services model that includes client registration information maintained at the registry.

An improved web services model forces the client, through a registration process, to unveil details about himself/herself/itself during the client's engagement with the registry. Here, use of the registry and/or access to the registry's service provider information is made conditional upon the client unveiling these details through the registration process. In so doing, the client base in no longer anonymous, and, more sophisticated business relationships can now be realistically entertained. In particular, removal of the anonymous client base is especially useful for those business relationships where it is essential (or may be essential) for the service provider to initiate "meaningful" communication to a client.

For instance, some forms of service provider initiated communication may involve notification to a client of certain required acts or duties on the part of the client. As a further example, consider a service provider that fills out and submits tax returns for its clients. Here, the client is expected to provide its financial information by a specific date and in a specific format specified by the service provider (e.g., the client is expected to fill out a form provided by the service provider). Here, the service provider may wish to retain the right to raise its fees, or cancel outright the service contract, if the client fails to perform its duties.

Without knowing who the client is (as in the case of the anonymous client described in the background), it is difficult for the service provider to, in a meaningful way, impose upon the client the duties of timely providing its financial information in the required format and the consequences of failing to do so. Without meaningful communication from the service provider to the client, the client could take the position that the service provider did not properly inform the client of these duties or the consequences of failing to execute them.

In other instances some kind of change regarding the service, after the relationship between the service provider and the client has been engaged, may need to be brought to the attention of one or more of the service provider's clients.

Consider again the tax return service described above if a change in the tax law occurs so as to require a new form to be filled out by the service's clients. Here, the service provider needs to forward a new form to all of its clients and to meaningfully communicate to them that the new form needs to be filled out. Without being able to reach all of its clients, the service provider will not be able to completely effect the tax law change amongst its client base. Recall that in the current UDDI model, only those clients that agree to make themselves available can be reached in this manner (leaving the possibility less than all of the clients will in fact be reached).

Moreover, in this case of an unexpected change in service, note that the time of the communication from the service provider to the client may not even be predictable (e.g., the change in the tax law could not have been predicted). As such, "ad hoc" meaningful communication in a direction from the service provider to the client base is often warranted to carry out successful business relationships, yet, because the present UDDI model does not entertain forced unveiling of its client base, such business relationships are presently not well supported.

The above example was written in terms of a "blanket" notification from a service provider to all of its clients. In still other cases, ad hoc communication may be needed in a direction from the service provider to only an appropriate portion of the service provider's client base. For example, if the tax return service provides tax return services for different countries, and if the above described tax law change occurs in only one of these countries, the new tax form only needs to be sent to that portion of the service provider's clients who are known to generate income in the country that instituted the tax law change. In this case, the ad hoc communication does not need to be a blanket communication to the entire client base, but rather, needs to be a "targeted" ad hoc communication to only an appropriate portion of its client base.

Thus, an extension of forced client registration at the registry 201 is the maintenance of detailed client registration information 204 at the registry 201 that can be searched over to identify an appropriate subset of a service provider's client base for reception of a communication from a service provider given a certain situation. It is envisioned that a service provider having a need to initiate meaningful communication to less than all of its clients will: 1) notify the registry 201 of the need to issue a communication; 2) provide search criteria for identifying the appropriate client "audience"; and, 3) provide the substance of the communication.

Here, search engine functionality/logic is built into the registry 201 that identifies the appropriate client audience from the registration information 204 in light of the search criteria given by service provider. When the appropriate client audience is identified by the registry's search engine, the registry 201 sends the substance of the communication from the service provider to the identified clients.

As an example, consider the above case in which an on line "multinational" tax return service attempts to communicate a tax law change in a particular country to those of its clients that generate income in the particular country. Here, the service provider (e.g., service provider $202_1$) would send to the registry 201: 1) search criteria sufficient to identify the appropriate portion of the service provider's client base (e.g., information that at least includes the country in which the tax law change occurred); 2) a request to search the client registration information 204; and, 3) the substance of the communication to be sent to the appropriate portion of the client base (e.g., a message that describes the tax law change and, perhaps, a new form to fill out).

In response to the receipt of this information, the registry's 201 search engine logic will search, in light of the search criteria submitted by the service provider, the service provider's client base. In this specific example, the service provider's client base at least includes those clients that have registered with the registry 201 and have been given information for accessing the service provider.

In a further embodiment, the service provider may further inform the registry 201 as to which registered clients the service provider has actually formed a formal business relationship with. Such information is to eliminate from the service provider's recognized client base those registered clients that have been given information by the registry 201 for accessing the service provider but who nevertheless did not form a formal business relationship with the service provider.

Regardless, the registry's search engine logic uses the search criteria (e.g., the country in which the tax law change occurred) to identify the appropriate portion of the service provider's client base (e.g., those members of the service provider's client base who generate income in the country in which the tax law change occurred). Upon identifying the appropriate portion of the service provider's client base, the registry sends a message to each client within the appropriate client audience to inform the client of the tax law change. The message may also include and any other substantive information sent to the registry by the service for forwarding to each of the members of the appropriate client audience.

Figure 3:
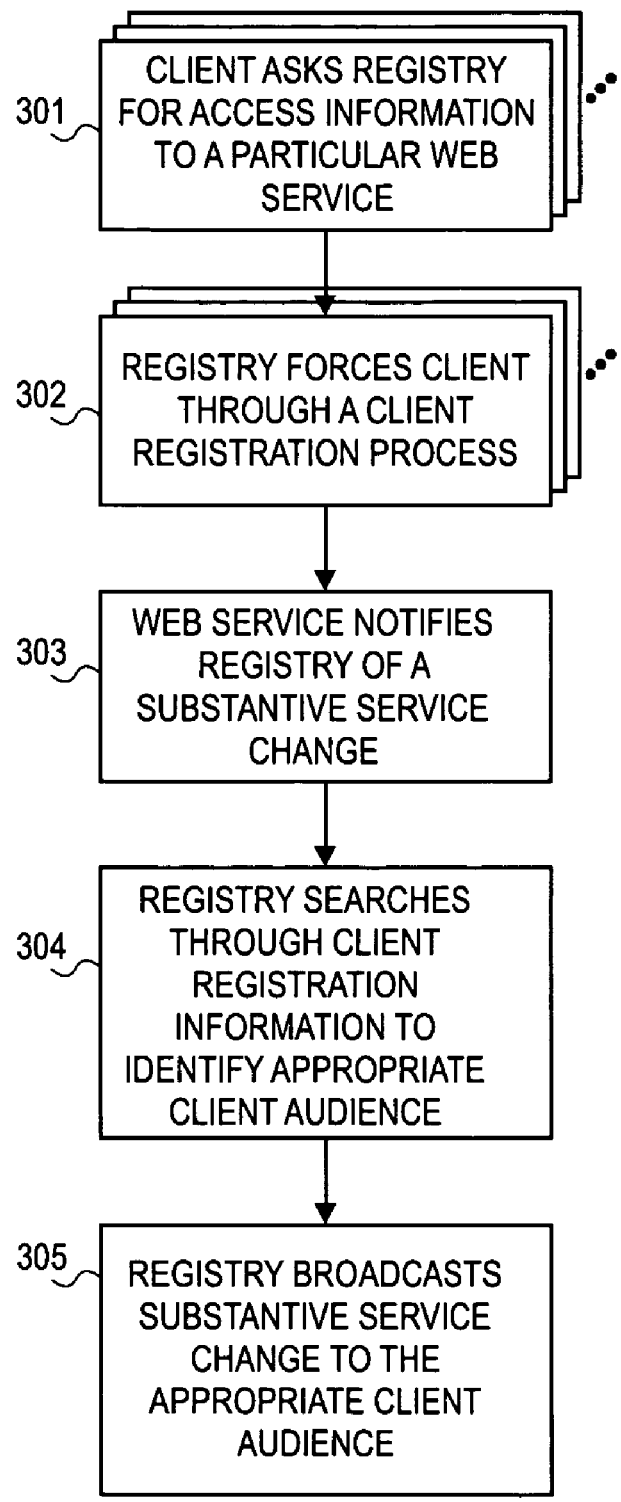
FIG. 3 shows a process that can be executed by the web service model of FIG. 2.

FIG. 3 outlines the process at a high level. According to the methodology of FIG. 3, a client 203 asks 301 a registry 201 for access information to a particular service provider. Prior to the client 203 being provided with the asked for information, however, the registry 201 forces the client 203 through a registration process 302 that causes the client 201 to unveil specific details about himself/herself/itself. A more detailed discussion of the types of information that is revealed during the registration process and the format of the client specific information is provided further below.

In alternative embodiments the registration process 302 may be invoked before the registry 201 is searched on behalf of the client 203. Here, once the registration process 302 is completed, the registry 201 may simply provide 301 the client 202 with the desired service provider access information (e.g., as the end product of a search request submitted to the registry by the client).

Note that FIG. 3 shows processes 301 and 302 as being multidimensional. This depiction is made to indicate that the registration process is undertaken at least for each separate client to whom access information for a particular service provider is sent. FIG. 3 continues with an abstraction of the example provided above where a change related to the service occurs, the service provider informs the registry of the change 303 and, in response, the registry searches 304 its client registration information for the service provider in order to identify the appropriate client audience to notify of the change. Once the appropriate audience for the change is identified the registry sends messages to each of them informing them of the change 305.

Frequently, the client base for a particular service provider contains different types of clients, and, as consequence, searching 304 is necessary at least to identify the appropriate type of client for a particular type of communication flow from the service provider to the client base. For example, consider an application software (the service provider) whose customers (clients) include various corporations that license its application software. The service provider is apt to recognize different client types (or "sub clients") associated within the same, umbrella corporate client/customer.

For example, a first client type for a corporate customer may be the manager of the corporation's IS department who is responsible for the defining of the desired software products and for the paying of the service provider's fees. If the service provider also automatically and remotely upgrades the corporation's computing systems with its application software upgrades, the service provider will also recognize the computing systems of the corporation as second type of client. Categorizing clients as being of the first or second type may take place for each of the service provider's corporate customers.

As such, when the service provider attempts to communicate the existence of a new application software product, it effects communication to all of its clients of the first type (i.e., the IS managers of all of its corporate customers). By contrast, when the service provider attempts to upgrade a particular corporate customer's computing systems, it restricts the information flow (in the form of new software) to clients of the second type associated with the particular corporate customer. If the service provider wanted to "blanket" upgrade all of its customers it would direct new software to all of its clients of the second type.

In each of these cases some form of intelligent searching 304 is performed at the registry in light of some search criteria that is provided by the service provider. In the first case (existence of new software product), the service provider informs the registry that all clients of the first type are to be identified for the communication. In the second case (upgrade of only a particular corporation's computing systems), the service provider informs the registry that all clients of the second type for a particular corporate customer are to be identified for the communication. In the third case (upgrade of all corporate customers' computing systems), the service provider informs the registry that all clients of the second type are to be identified for the communication.

Figure 4:
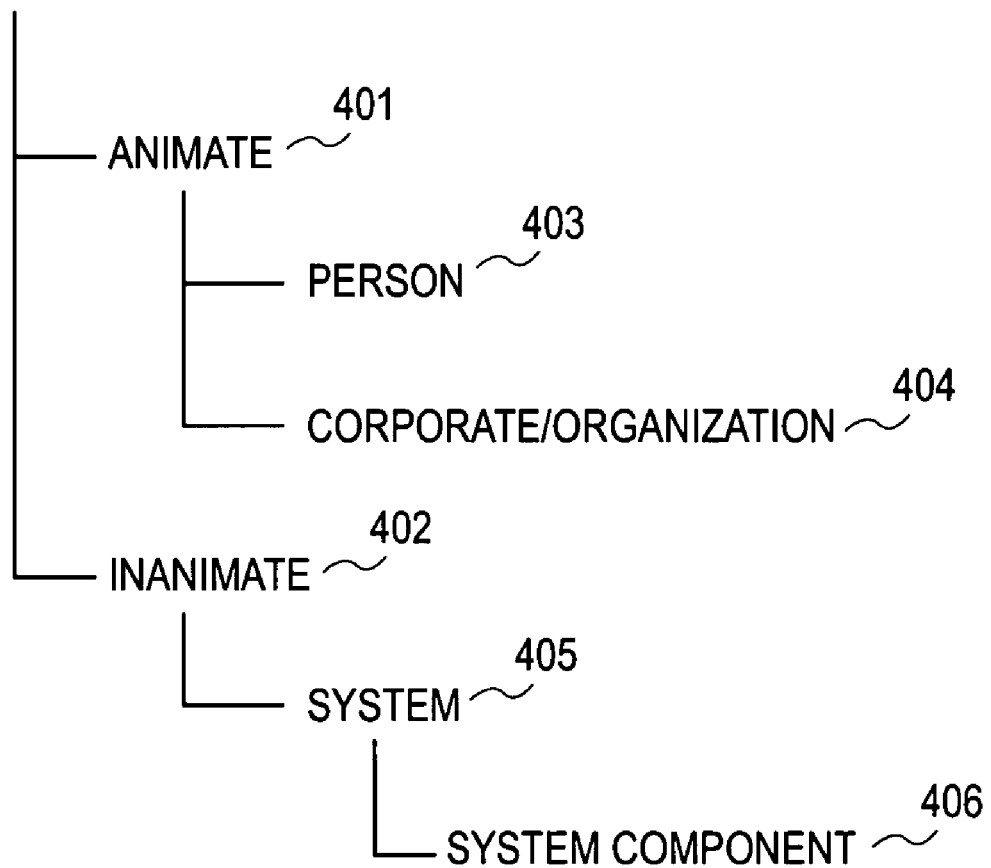
FIG. 4 shows a hierarchy for categorizing different type of client from the perspective of a service provider.

FIG. 4 shows at a high level the different types of client categories that may exist. To first order, clients can be recognized as animate 401 or inanimate 402. Animate clients are those that have some form of legal standing (such as a person 403 or corporation 404). Often, to protect itself, a service provider may limit itself so as to only form a contract with an animate client. Typical examples of animate clients are employees of corporations and/or the corporations themselves.

Inanimate clients are machines with whom the service provider has some form of working relationship. For example, recall the example above in which a application service provider may automatically upgrade a corporate customer's computing systems. Here, the corporate customer's computing systems which receive software upgrades from the service provider are effectively inanimate clients of the service provider. Any other entity with whom the service communicates and is a machine rather than an animate being may be deemed an inanimate client.

FIG. 4 shows a "system" inanimate client category 405 and a "system component" inanimate client category 406. Here, an inherent hierarchy exists. A system is a working entity capable of individual classification, function or categorization (such as a computing system or network). A system component is a working entity capable of individual classification, function or categorization; and which, is part of a recognized "system" client. A common example of a system client would be a computing system and a common example of a system component client would be application software that runs on the computing system.

In various embodiments, the registry is responsible for maintaining and organizing the client registration information. In an embodiment, each client type warrants its own "taxonomy" of information. That is, the specific information that is recorded for a client depends upon the client's type.

For example, in the case of a client of the "person" type, the taxonomy of the recorded information can include: 1) the name of the person; 2) a home address and phone number for the person; 3) a work address and phone number for the person; 4) a first email address for the person (e.g., a home email); 5) a second email address for the person (e.g., a work email); 6) a mobile phone number for the person; 7) a job description or title for the person; 8) the person's citizenship; 9) a unique alphanumeric identifier for the person such as a social security number or passport number; 10) the name of the person's employer (e.g., the name of a corporation); and, 11) the primary language that the person speaks.

In the case of a client of the "corporation" or "organization" type, the taxonomy of the recorded information can include: 1) the name of the corporation/organization; 2) an address for the corporation/organization; 3) the state of incorporation for the corporation/organization; 4) a primary contact for the corporation/organization (e.g., the name of an employee); 5) a secondary contact for the corporation/organization (e.g., the name of another employee).

In the case of a client of the "system" type, the taxonomy of the recorded information can include: 1) a name for the client; 2) a person to which the system belongs; 3) the name of the corporation or organization to which the system belongs (with the person named in 2) typically being an employee of the corporation/organization named in 3)); 4) the type of system (e.g., hardware, software, network, etc.); 5) communication protocols needed to communicate to the system.

In the case of a client of the "system component" type, the taxonomy of the recorded information can include all the items listed above for the "system" type but further including the name of the system to which the system component belongs.

Note that clients can be registered in the registry's client information even if the client never actually makes an inquiry into the registry itself. For example, in the case of an application software service provider that automatically upgrades the software of its system clients and system component clients, the system clients and system component clients may be listed in the client registration information of the registry as part of an information exchange that naturally flows from a business relationship being entered into with the service provider (rather than requiring each of the system and system component clients to actually invoke the registry in order to be listed in the registry's client information).

The client registry information, like the registry itself, can be distributed over a network servers (such as those servers used to implement the registry). The registration information that is "filled out" for a client (e.g., pursuant to a taxonomy as described above) may be kept as text files such as XML files or other types of files. Messages used to communicate between the registry and the client during the registration process may use the SOAP protocol or other technologies such as DCOM and CORBA.

Figure 5:
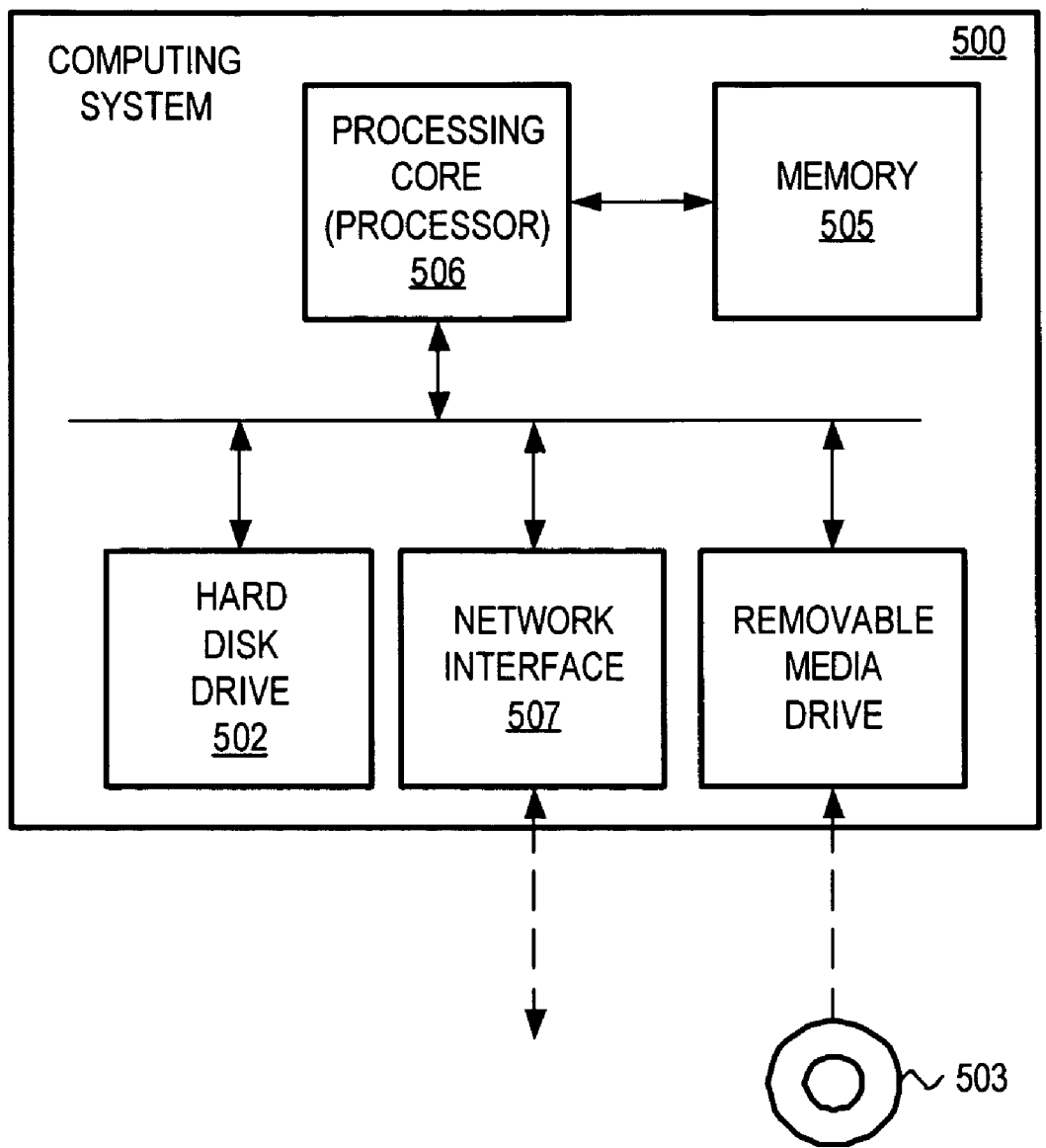
FIG. 5 shows an embodiment of a computing system.

An example of a server which may be used to implement a registry having client registration information is shown in FIG. 5. The server of FIG. 5 may be Java 2 Enterprise Edition ("J2EE") server which supports Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 5 is a block diagram of a computing system 500 (such as a server) that can execute program code stored by an article of manufacture. It is important to recognize that the computing system block diagram of FIG. 5 is just one of various computing system architectures. The applicable article of manufacture may include one or more fixed components (such as a hard disk drive 502 or memory 505) and/or various movable components such as a CD ROM 503, a compact disc, a magnetic tape, etc. In order to execute the program code, typically instructions of the program code are loaded into the Random Access Memory (RAM) 505; and, the processing core 506 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An article of manufacture including a machine-readable medium having instructions stored thereon which, when executed by a machine, causes the machine to perform a method, the method comprising:

implementing a Universal Discovery, Description and Integration (UDDI) web services environment in which web based service providers registered with a UDDI web based registry can be discovered and accessed with the web based registry;

forcing a client to undergo a registration process as a condition for said client either discovering or accessing a web based service provider through the UDDI web based registry, said registration process including gathering information describing said client, categorizing the client as belonging to a specific client type based on the gathered information describing the client, and storing in the UDDI web based registry information indicating that the client is of the client type;

determining that the registered client needs to be communicated to, including accessing the information in the UDDI web based registry indicating that the client is of the client type; and after a business relationship has been engaged with said service provider, said UDDI web based registry receiving notification from said service provider indicating that said registered client needs to be communicated to.

2. The article of manufacture of claim 1 wherein determining that the registered client needs to be communicated to is in response to said notification.

3. The article of manufacture of claim 1 wherein said type is a corporation.

4. The article of manufacture of claim 3 wherein said information includes one or more of the following:

a) said corporation's name;
b) an address for the corporation;
c) the state of incorporation for the corporation;
d) a primary contact for the corporation.

5. The article of manufacture of claim 1 wherein said type is an organization.

6. The article of manufacture of claim 5 wherein said information includes one or more of the following:

a) said organization's name;
b) an address for the organization;
c) the state of incorporation for the organization;
d) a primary contact for the organization.

7. The article of manufacture of claim 1 wherein said type is a person.

8. The article of manufacture of claim 7 wherein said information includes one or more of the following:

a) the name of the person;
b) a home address and phone number for the person;
c) a work address and phone number for the person;
d) an email address for the person;
e) a mobile phone number for the person;
f) a job description or title for the person;
g) the person's citizenship;
h) a unique alphanumeric identifier for the person;
i) the name of the person's employer;
j) the primary language that the person speaks.

9. The article of manufacture of claim 1 wherein said type is a system.

10. The article of manufacture of claim 9 wherein said information includes one or more of the following:

a) a name for the client;
b) a person to which the system belongs;
c) the name of the corporation or organization to which the system belongs;
d) information that identifies the client as being hardware, software or a network;
e) a communication protocol needed to communicate to the system.

11. The article of manufacture of claim 1 wherein said type is a system component.

12. The article of manufacture of claim 11 wherein said information includes one or more of the following:

a) a name for the client;
b) a person to which the system belongs;
c) the name of the corporation or organization to which the system belongs;
d) information that identifies the client as being hardware, software or a network;
e) a communication protocol needed to communicate to the system;
f) the name of the system to which the system component belongs.

13. An article of manufacture including a machine-readable medium having instructions stored thereon which, when executed by a machine, causes the machine to perform a method, the method comprising:

implementing a Universal Discovery, Description and Integration (UDDI) web services environment in which web based service providers registered with a UDDI web based registry can be discovered and accessed with the UDDI web based registry;

forcing a client to undergo a registration process of the UDDI web based registry as a condition for said client either discovering or accessing a web based service provider through the UDDI web based registry, said registration process including the UDDI web based registry storing information indicating that the client is categorized as belonging to a client type;

determining that the registered client needs to be communicated to, including accessing the information in the UDDI web based registry indicating that the client is categorized as belonging to the client type; and after a business relationship has been engaged with said service provider, said web based registry receiving notification from said service provider indicating that said registered client needs to be communicated to.

14. A method, comprising:

implementing a Universal Discovery, Description and Integration (UDDI) web services environment in which web based service providers registered with a UDDI web based registry can be discovered and accessed with the UDDI web based registry;

forcing a client to undergo a registration process as a condition for said client's discovering and/or accessing a web based service provider through the UDDI web based registry, said registration process including gathering information describing said client, categorizing the client as belonging to a specific client type based on the gathered information describing the client, and storing in the UDDI web based registry information indicating that the client is of the client type;

determining that the registered client needs to be communicated to, including accessing the information in the UDDI web based registry indicating that the client is of the client type; and after a business relationship has been engaged with said service provider, said UDDI web based registry receiving notification from said service provider indicating that said registered client needs to be communicated to.

15. The method of claim 14 wherein determining that the registered client needs to be communicated to is in response to said notification.

* * * * *